United States Patent
Lahde

[15] 3,644,809
[45] Feb. 22, 1972

[54] SELF-STARTING FOR DC MOTORS

[72] Inventor: Reinhard N. Lahde, Los Altos, Calif.

[73] Assignee: Lockheed Aircraft Corporation, Burbank, Calif.

[22] Filed: Nov. 14, 1969

[21] Appl. No.: 876,757

[52] U.S. Cl................................318/138, 310/154, 310/156, 310/41
[51] Int. Cl.......................................................H02k 29/00
[58] Field of Search....................310/163, 41, 181, 154, 156; 318/138, 254

[56] References Cited

UNITED STATES PATENTS

| | | | |
|---|---|---|---|
| 2,867,762 | 1/1959 | Lehman et al. | 318/254 |
| 2,890,400 | 6/1959 | Cluwen | 318/254 |
| 2,968,755 | 1/1961 | Baermann | 310/154 X |
| 3,156,858 | 11/1964 | Reitherman | 318/138 |
| 3,370,189 | 2/1968 | Haydon et al. | 310/134 X |
| 3,379,946 | 4/1968 | Croymans | 318/138 |
| 3,493,831 | 2/1970 | Roberts | 310/41 X |
| 2,492,435 | 12/1949 | Ostline | 318/254 |
| 2,499,316 | 2/1950 | Johnson | 310/49 |
| 2,546,729 | 3/1951 | De Millar | 310/49 X |
| 2,864,018 | 12/1958 | Aeschmann | 318/254 X |
| 3,304,481 | 2/1967 | Saussele | 318/138 |
| 3,439,200 | 4/1969 | Saito et al. | 310/49 |

*Primary Examiner*—G. R. Simmons
*Attorney*—George C. Sullivan and Ralph M. Flygare

[57] ABSTRACT

A noncommutating self-starting direct current motor having a magnetic rotor which turns through a position in which the motor field produces no driving torque on the rotor and a position in which the field produces maximum driving torque on the rotor, and positioning means for arresting the rotor in its maximum torque position when the motor field is turned off so as to condition the motor for automatic restarting when the field is restored.

9 Claims, 7 Drawing Figures

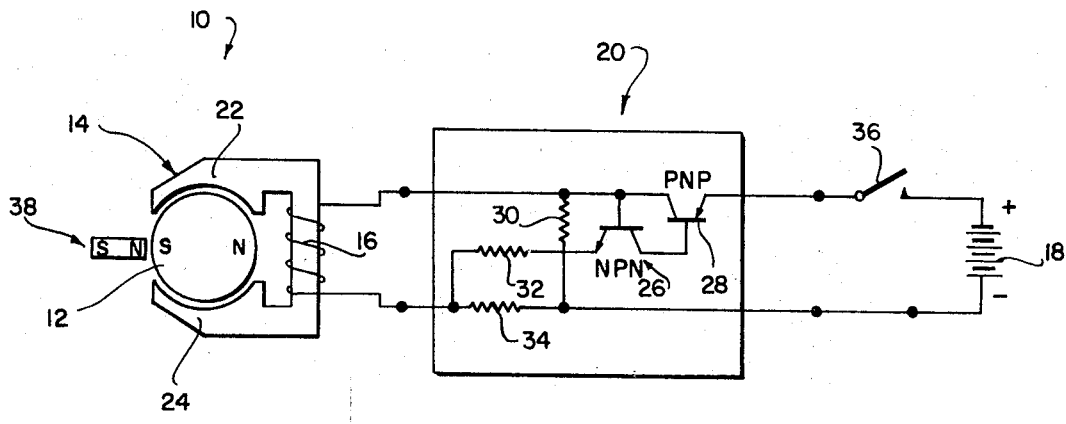
FIG_1
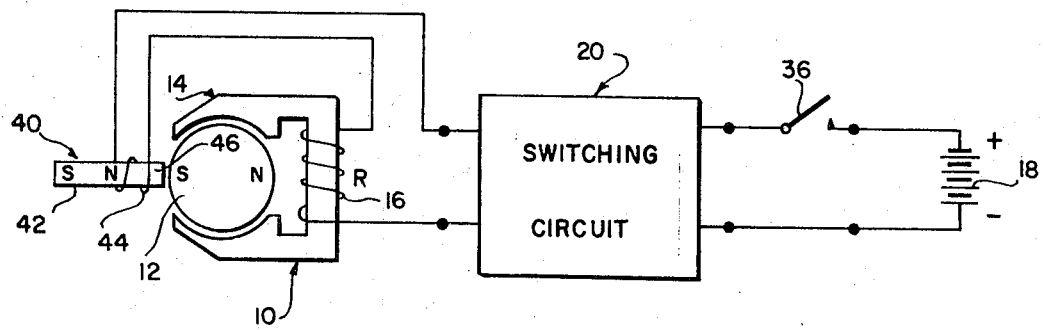
FIG_2
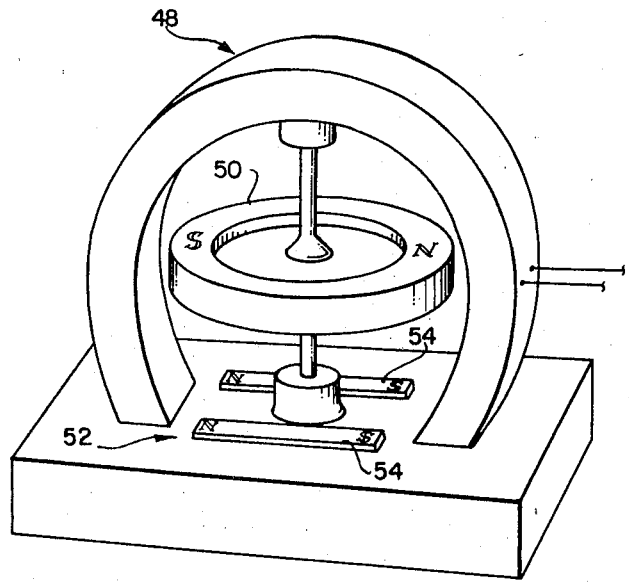
FIG_3
INVENTOR.
REINHARD N. LAHDE

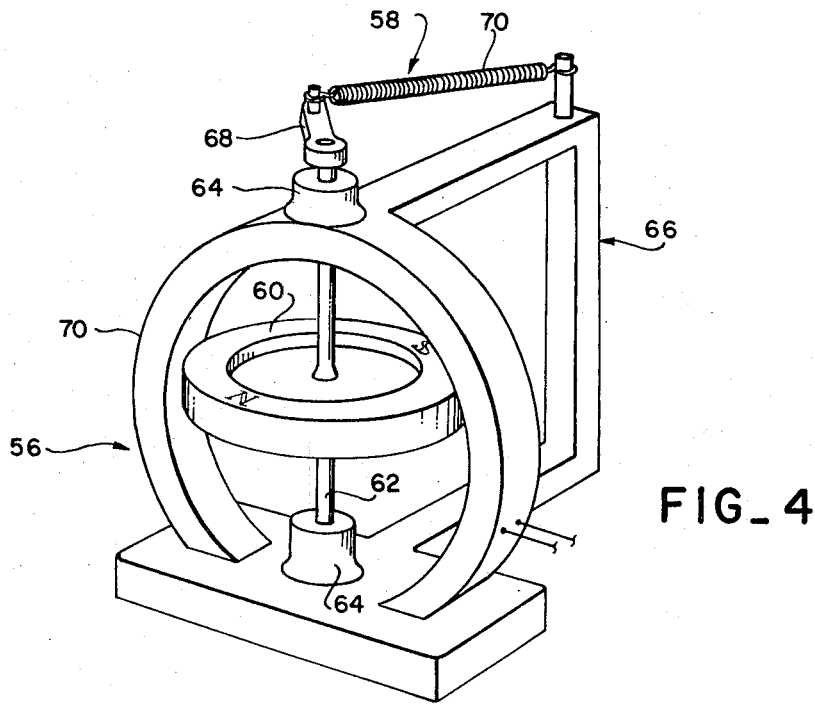
FIG_4
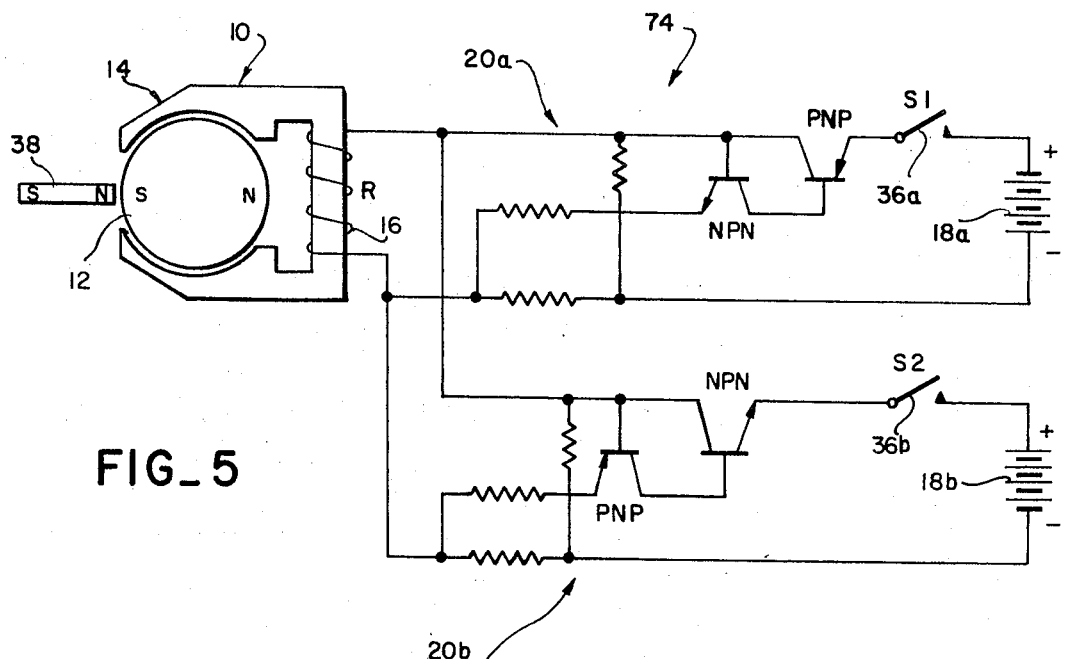
FIG_5
INVENTOR.
REINHARD N. LAHDE

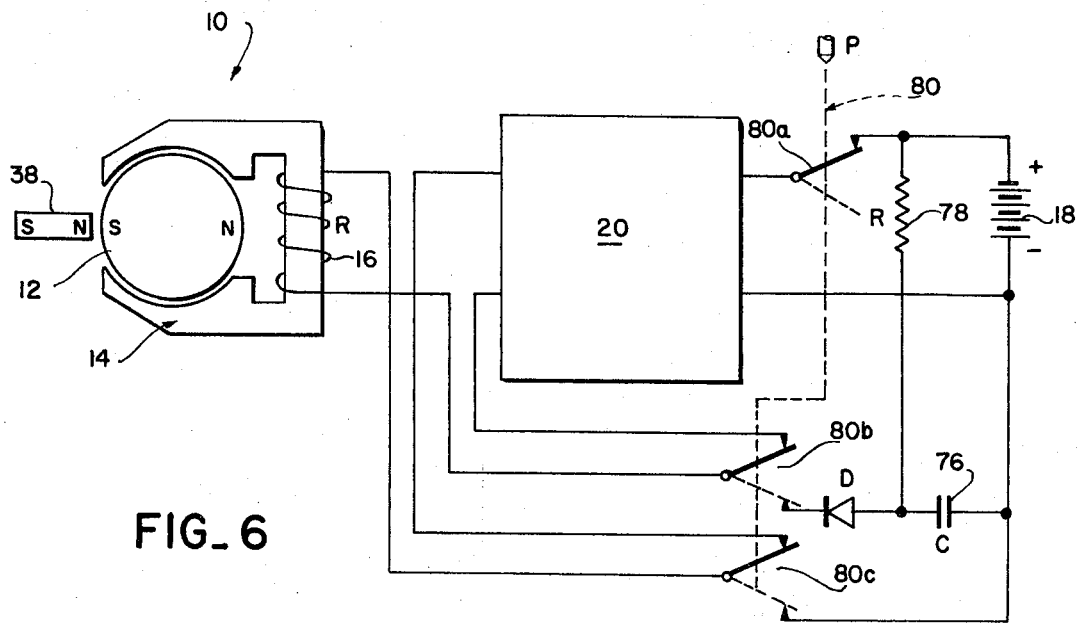
FIG_6
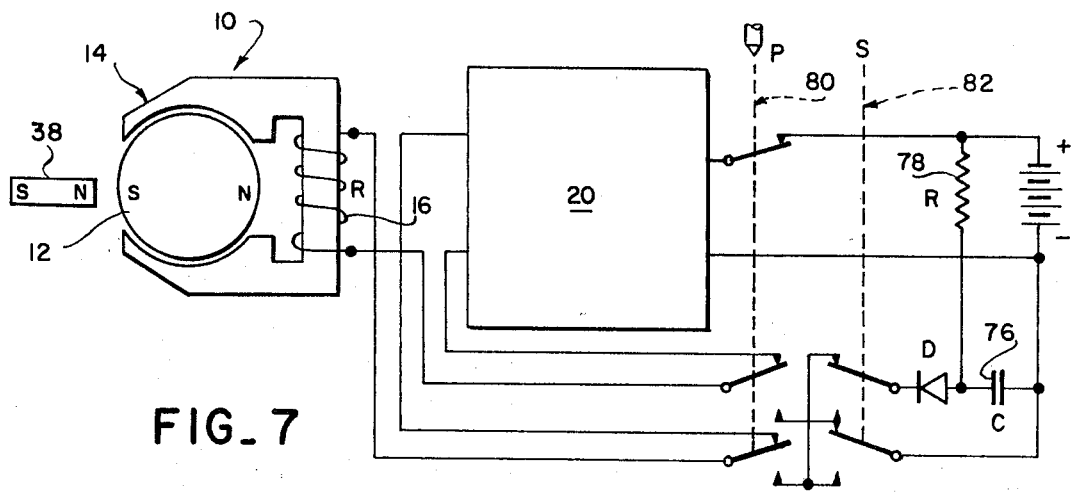
FIG_7

3,644,809

SELF-STARTING FOR DC MOTORS

REFERENCE TO COPENDING APPLICATIONS

Reference is made herein to my copending application Ser. No. 389,118, filed Aug. 12, 1964, and entitled "D. C. MOTOR", now U.S. Pat. No. 3,541,407.

BACKGROUND OF THE INVENTION

1. Field of the Invention

This invention relates generally to motors and more particularly to a simplified self-starting direct current motor.

Prior Art

Conventional direct current motors require a commutator, make and break contacts, or some other mechanical switching mechanism for controlling current flow through the motor armature as the latter turns. Recently, transistorized switching circuits have been devised to perform electrically the switching function of the mechanical switching mechanism required in the existing motors. My referenced patent discloses a simplified direct current motor of this type.

Briefly, my earlier motor has a magnetic rotor with circumferentially spaced north and south poles. About the rotor is a field structure including a coil to be energized with direct current to produce a magnetic field for turning the rotor. Connected to the field coil is a transistorized switching circuit which switches the field on and off in the proper timing to cause continued rotation of the rotor. This switching circuit is triggered between its on and off states by the voltage induced in the field structure by the turning rotor. One disadvantage of my prior motor resides in the fact that it is self-starting only if the rotor is initially in a position wherein its magnetic poles are located in a plane transverse to the lines of force of the motor field. In this position, a relatively large starting torque is produced on the rotor when the field coil is energized by the switching circuit. Assuming low bearing friction, the momentum acquired by the rotor during its first 90° of rotation is sufficient to carry the rotor through the following 180° of rotation, during which the motor field is turned off, into the next power revolution. This initial rotation of the rotor actuates the switching circuit to continue rotation of the rotor. Under these conditions, then, the motor is self-starting.

On the other hand, if the rotor comes to rest with its magnetic poles in a plane generally parallel to the lines of the motor field, the field produces no driving torque on the rotor or insufficient torque to start its rotation. In this case, the motor must be started manually by giving its rotor a slight spin. Under these conditions, then, the motor is not self-starting.

SUMMARY OF THE INVENTION

The present invention avoids the above disadvantage of my earlier direct current motor by providing the latter with a positioning means for arresting its magnetic rotor in the proper starting position. It will be recognized from the earlier discussion that this proper starting position is one in which the magnetic poles of the rotor are disposed in a plane transverse to the lines of the motor field, such that this field, when energized, will produce a relatively large driving torque on the rotor. The initial rotation imparted to the rotor by this starting torque activates the switching circuit of the motor to continue rotation of the rotor. A feature of one disclosed embodiment resides in means for inactivating the rotor positioning means when the motor is started. This is desirable to reduce or eliminate, in the starting and running phases of the motor, the positioning force imposed on the rotor by the positioning means. Another feature of the invention is concerned with various starting switch arrangements for the motor. At this point, it should be noted that while the invention will be disclosed in connection with the direct current motor disclosed in my aforementioned patent, the invention is not limited in application to this particular motor.

BRIEF DESCRIPTION OF THE DRAWINGS

FIG. 1 illustrates a self-starting DC motor according to the invention equipped with magnetic-rotor-positioning means;

FIG. 2 illustrates a modified self-starting motor equipped with magnetic-rotor-positioning means and means for neutralizing the magnetic field of the positioning means during the starting phase of the motor;

FIG. 3 illustrates a further modified self-starting DC motor according to the invention;

FIG. 4 illustrates a self-starting DC motor according to the invention equipped with mechanical-rotor-positioning means;

FIG. 5 illustrates a self-starting motor according to the invention embodying a starting circuit for initiating rotation of the rotor in either direction of rotation;

FIG. 6 illustrates a self-starting motor embodying an alternative starting circuit; and FIG. 7 illustrates a self-starting motor embodying a further alternative starting circuit.

DESCRIPTION OF THE PREFERRED EMBODIMENTS

Turning first to FIG. 1, there is illustrated a self-starting motor 10 according to the invention. This motor has a magnetic rotor 12 with diametrically opposed north and south poles N, S. About the rotor 12 is a field structure 14 including a coil 16. Coil 16 is energized from a DC power supply 18, in this instance a battery, through a switching circuit 20. Coil 16, when energized, produces a magnetic field between two magnetic poles 22, 24 of the field structure 14. These magnetic poles are located at diametrically opposite sides of the rotor 12.

The switching circuit 20 is identical to that disclosed in my earlier mentioned patent. Accordingly, there is no need to describe this circuit in explicit detail. Suffice it to say that the circuit includes a pair of transistors 26, 28 and three resistors 30, 32, and 34 which are connected in the manner illustrated and balanced in a manner such that the circuit is activated by the voltages induced in the field coil 16 by rotation of the rotor 12 to switch the current flow through the coil off and on in the proper timed relation to cause continuous rotation of the rotor 12. A switch 36 is placed between the power supply 18 and the switching circuit 20 to permit starting and stopping of the motor.

The motor 10 described to this point is identical to that disclosed in my earlier mentioned patent. As noted, this motor presents the inherent disadvantage that it is self-starting only when the rotor 12 is initially in its position of FIG. 1 or in a position 180° from the illustrated position. Thus, in each of these rotor positions, the rotor poles N, S are disposed in a plane transverse to the lines of force of the motor field which exists between the magnetic poles 22, 24 of the motor field structure 14. Obviously, when the rotor is in this position, energizing of the field coil 16 produces a relatively large starting torque on the rotor. Assuming relatively low bearing friction, the initial spin imparted to the rotor by this starting torque is sufficient to activate the motor switching circuit 20. When thus activated, the switching circuit periodically energizes the field coil 16 in the proper timed relation to continue rotation of the rotor.

Assume now that the rotor 12 comes to rest in a position spaced 90° from that illustrated in FIG. 1. In this case, the plane of the rotor poles N, S would then be generally parallel to the lines of force of the motor field between its magnetic field poles 22, 24. Under these conditions, energizing of the field coil 16 would produce little if any driving torque on the rotor. Accordingly, it would be necessary to start the motor by hand by imparting an initial spin to the rotor.

According to the present invention, this disadvantage is avoided by providing the motor 10 with positioning means 38 for always arresting the rotor 12 in the proper starting position, i.e., the position of FIG. 1 or a position displaced 180° from the illustrated position. By thus arresting the rotor in the proper starting position, the motor 10 obviously becomes self-starting since initial energizing of the motor field coil 16 will impart a sufficient spin to the rotor 12 to activate the motor-switching circuit 20 and thereby continue rotation of the rotor. The invention contemplates, within its scope, a variety of rotor positioning means. In FIG. 1, for example, the rotor positioning means 38 is a simple permanent magnet which is mounted in a stationary position with one pole of the magnet located close to the circumference of the rotor 12. In this instance, the north pole of the magnet is located adjacent the rotor. Accordingly, the positioning magnet 38 is effective to arrest the rotor 12 in its illustrated position, wherein the south pole of the rotor is located directly opposite the north pole of the magnet.

It will be understood that the magnet 38 imposes a magnetic centering force on the rotor 12 when the field coil 16 is deenergized so as to bring the rotor to rest in its illustrated starting position. While this centering action on the rotor is desirable during the stopping phase of the motor, it is undesirable during the starting phase of the motor. Thus, during the starting phase, the magnetic force on the rotor resists the initial spin which is imparted to the rotor by the motor field and is required to activate the switching circuit 20 for continuing rotation of the rotor. FIG. 2 illustrates an alternative rotor positioning means 40 which avoids this problem. Positioning means 40 comprises a permanent rotor-positioning magnet 42 which is mounted in a stationary position adjacent the rotor 12 to arrest the latter in its proper starting position, as in the case of FIG. 1. Encircling the rotor end of the positioning magnet 42 is a coil 44. This coil is connected in series between the motor switching circuit 20 and the motor field coil 16. Accordingly, the motor field coil 16 and the positioning magnet coil 44 are energized concurrently. The magnet coil is wound in a direction such that current flow through this coil produces an electromagnetic field which opposes and thus tends to cancel the magnetic field of the rotor positioning magnet 42. Preferably, the coil 44 is wound about a magnetically permeable tip 46 on the positioning magnet 42 in order to prevent demagnetization of the latter magnet by the coil.

From this description, it is evident that when the motor switch 36 is opened to stop the motor 10, the positioning magnet 42 becomes effective to arrest the rotor 12 in its proper starting position. When the switch 36 is closed to start the motor, the magnetic field of the positioning magnet 42 is at least partially neutralized by the magnetic field of the coil 44, thereby reducing the magnetic force imposed on the rotor 12 by the positioning magnet 42 during the starting phase of the motor. Obviously, the number of turns in the magnet coil 44 may be selected to virtually eliminate all magnetic drag on the rotor.

Turning to FIG. 3, there is illustrated a modified direct current motor having an annular, ironless field structure 48 comprising a coil. Rotatably mounted within this coil, for turning about a diameter of the coil, is a magnetic rotor 50 having north and south poles N, S. The motor field coil 48 is energized through a transistorized switching circuit 20 in the same manner as the earlier described motors. In this case, the motor is provided with rotor positioning means 52 for arresting the rotor in the proper starting angle relative to the field coil 48. The positioning means 52 comprise a pair of permanent bar magnets 54 disposed in planes parallel to the plane of the field coil 48 and located at opposite sides of the spin axis of the rotor 50. These magnets have their like poles adjacent one another. It will be understood by those versed in the art that the positioning means 52 is effective to bring the rotor 50 to rest in the proper starting angle relative to the field coil 48 when this coil is deenergized, thus to condition the motor to restart automatically when the field coil is reenergized.

All of the rotor-positioning means described thus far are magnetic means. FIG. 4 illustrates a modified direct current motor 56 equipped with a mechanical rotor-positioning means 58. In this case, the rotor 60 of the motor has a central shaft 62 supported in bearings 64 carried by a frame 66. Attached to one end of the rotor shaft 62 is a crank arm 68. A spring 70 is connected between the outer end of this crank arm and the frame 66. About the rotor 60 is a field structure 70 like that embodied in the motor of FIG. 3. This field structure is energized through a switching circuit 20.

From this description, it is evident that when the motor 56 is deenergized, the rotor-positioning spring 70 arrests the rotor 60 in a predetermined angular position. In this position, the north and south poles of the rotor are disposed in the plane of the motor field coil. Accordingly, when the motor is energized, a starting torque is applied to the rotor 60 for imparting an initial spin to the rotor for starting the motor, as before.

It will be immediately evident to those versed in the art that a variety of other mechanical rotor-positioning means may be employed in the present motor. FIG. 4 represents only one of these mechanical means. Other possible mechanical arrangements may comprise cams, detents, and various other mechanical configurations. If desired, the mechanical-positioning means may be inactivated by centrifugal force, or in some other way, when the motor is energized so as to reduce or eliminate force or torque imposed on the rotor by the positioning means.

FIGS. 5 through 7 illustrate three alternative starting circuits for the present self-starting motor. The particular motor shown is equipped with a rotor-positioning magnet 38 like that in the motor of FIG. 1. However, it will become evident from the ensuing description that the starting circuits of FIGS. 5 through 7 may be used, as well, with any of the described self-starting motor configurations of the invention. The starting circuit 74 of FIG. 5 includes a pair of switching circuits 20a, 20b connected in electrical parallel to the motor coil 16 and energized from DC power supplies 18a, 18b through starting switches 36a, 36b. The terminals of the power supplies are reversed. Starting circuit 20a is identical to the starting circuit 20 discussed earlier; starting circuit 20b differs only in that a PNP-transistor is used instead of an NPN, and vice versa, in accordance with the reversed direction of current flow in corresponding parts of the circuit. Accordingly, it will be understood that closing of the switch 36a starts the motor 10 in one direction of rotation and closing of the switch 36b starts the motor in the opposite direction of rotation.

The starting circuit of FIG. 6 has a switching circuit 20, a condenser 76 connected in electrical series with a charging resistor 78 across the DC power supply 18, and a starting switch 80. In the normal running position of the switch, shown in full lines in FIG. 6, the switch contacts 80a, 80b, 80c are closed to connect the input of the switching circuit 20 to the power supply 18 and the output of the switching circuit to the motor field coil 16. The motor 10 is then conditioned for running in the manner explained earlier. In the starting position of the switch 80, shown in broken lines, the switch disconnects the switching circuit 20 from both the motor 10 and the power supply 18 and connects the starting condenser 76 across the motor coil 16. The condenser then discharges through the coil to start the motor 10. The switch 80 must be returned to its running position before the rotor 12 of the motor comes to rest following the initial spin imparted to the roller by the condenser charge.

The starting circuit of FIG. 7 has a switching circuit 20, a starting condenser 76, a charging resistor 78, and a starting switch 80 arranged in essentially the same manner as in the starting circuit of FIG. 6. In addition to these circuit elements, however, the starting circuit of FIG. 7 is equipped with a reversing switch 82 which may be set to discharge the condenser 76 in either direction through the motor field coil 16 when the starting switch 80 is closed to its starting position. The starting circuit of FIG. 7, therefore, permits starting of the motor 10 in either direction of rotation.

While the present invention has been disclosed in connection with the two-pole motor of my aforementioned patent, it will be understood that the invention may be utilized, as well, with any of the multiple pole motors disclosed in the said patent. Moreover, the rotor positioning means of the invention may conceivably be utilized to advantage on other types of direct current motors.

What is claimed as new in support of Letters Patent is:
1. A self-starting direct current motor comprising:
a magnetic rotor having circumferentially spaced north and south poles,
an ironless electromagnetic field structure comprising a coil uniformly spaced from said rotor and adapted to be intermittently energized by direct current to produce an intermittent magnetic field for continuously rotating said rotor,
said rotor being rotatable through a starting position wherein said intermittent magnetic field produces a relatively large driving torque on said rotor, and
rotor-positioning means spaced apart from said field structure for arresting said rotor in said starting position when said field structure is deenergized.

2. A motor according to claim 1 wherein:
said motor-positioning means comprises magnetic means coacting with the field of said rotor so as to statically orient said rotor in said starting position.

3. A motor according to claim 1 wherein:
said motor includes a frame supporting said rotor, and
said rotor-positioning means comprises mechanical indexing means operatively connected between said rotor and frame.

4. A motor according to claim 1 wherein:
said rotor-positioning means comprises a permanent magnet having one pole adjacent said rotor and coacting therewith so as to statically orient said rotor in said starting position.

5. A motor according to claim 1 wherein said rotor-positioning means comprises:
a permanent magnet having a magnetically permeable tip extending from one pole thereof;
a bucking coil wound on said permanent magnet intermediate the poles thereof in a manner such that when said coil is energized with a direct current it will produce a magnetic field which at least partially nullifies the field of said permanent magnet; and
means for intermittently energizing said bucking coil concurrently with energization of said electromagnetic field structure.

6. A self-starting brushless direct current motor comprising:
a magnetic rotor having circumferentially spaced north and south poles,
an ironless electromagnetic field structure comprising a coil adapted to be intermittently energized by direct current to produce an intermittent magnetic field for continuously rotating said rotor, and wherein the spacing between said coil and said rotor remains uniform during rotation of said rotor;
a switching circuit connected to said coil for regulating current flow through said coil in response to rotation of said rotor in such a manner as to cause continuous rotation of said rotor, said rotor being rotatable through a starting position wherein said rotor poles are oriented in self-starting relation to said magnetic field structure to produce a relatively large driving torque on said rotor; and
magnetic means coacting with the poles of said rotor, and spaced apart from said field structure for arresting said rotor in said starting position when said coil is deenergized.

7. A motor according to claim 6 wherein:
said magnetic means comprises a permanent magnet having one pole adjacent said rotor.

8. A motor according to claim 7 wherein said rotor-positioning means comprises:
a permanent magnet having a magnetically permeable tip extending from one pole thereof and adjacent said rotor;
a bucking coil surrounding said magnet in a manner such that energizing of said coil with a direct current produces a magnetic field which at least partially nullifies the magnetic field of said magnet; and
means for energizing said bucking coil concurrently with energization of said field structure.

9. A self-starting brushless direct current motor comprising:
a magnetic rotor having circumferentially spaced north and south poles;
an electromagnetic field structure about said rotor including a coil adapted to be intermittently energized by direct current to produce an intermittent magnetic field for continuously rotating said rotor;
a switching circuit connected to said coil for regulating current flow through said coil in response to rotation of said rotor in such a manner as to cause continuous rotation of said rotor, said rotor being rotatable through a starting position wherein said rotor poles are oriented in self-starting relation to said magnetic field to produce a relatively large driving torque on said rotor;
starting means for said motor including a pair of terminals for connection to a DC-power source, a condenser, and switch means for selectively connecting said terminals to said switching circuit and condenser for selectively energizing said circuit and charging said condenser, and disconnecting said switching circuit from said field coil and terminals and discharging said condenser through said coil to initiate rotation of said motor, said switch means including means for selectively discharging said condenser in either direction through said field coil to initiate rotation of said rotor in either direction; and
magnetic means coacting with the poles of said rotor for arresting said rotor in said starting position when said coil is deenergized.

* * * * *